United States Patent
Chen et al.

(10) Patent No.: US 9,239,684 B2
(45) Date of Patent: Jan. 19, 2016

(54) ELECTRONIC DEVICE AND METHOD FOR TESTING REDUNDANT ARRAY OF INDEPENDENT DISKS LEVEL

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Ji-Bao Chen, Shenzhen (CN); Ji-Ping Chen, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 120 days.

(21) Appl. No.: 14/218,656

(22) Filed: Mar. 18, 2014

(65) Prior Publication Data

US 2015/0177998 A1    Jun. 25, 2015

(30) Foreign Application Priority Data

Dec. 19, 2013    (CN) .......................... 2013 1 07122221

(51) Int. Cl.
G06F 3/06    (2006.01)
G06F 11/16   (2006.01)

(52) U.S. Cl.
CPC .......... *G06F 3/0619* (2013.01); *G06F 3/0632* (2013.01); *G06F 3/0689* (2013.01); *G06F 11/167* (2013.01)

(58) Field of Classification Search
CPC ... G06F 3/0689; G06F 3/0619; G06F 3/0632; G06F 11/167; G06F 11/2221; G06F 11/3414; G06F 11/3692; G06F 11/22; G06F 11/3485; G06F 11/3428
See application file for complete search history.

(56) References Cited

U.S. PATENT DOCUMENTS

| 6,718,434 B2 * | 4/2004 | Veitch et al. | G06F 3/0605 711/114 |
| 8,631,201 B2 * | 1/2014 | Koshiyama | G06F 3/0607 711/114 |

* cited by examiner

*Primary Examiner* — Nadeem Iqbal
(74) *Attorney, Agent, or Firm* — Novak Druce Connolly Bove + Quigg LLP

(57) ABSTRACT

A Redundant Array of Independent Disks (RAID) card is coupled to a baseboard management controller (BMC) of an electronic device. The BMC is coupled to a host device, and includes a storage unit for storing data of RAID level. A method can include obtaining a boot command from the host device, and generating a control signal according to the stored RAID level in response to the boot command. The method further includes transmitting the control signal to the RAID card, to direct the RAID card to set the stored RAID level, testing whether the stored RAID level is correctly set, and storing data indicative of the tested result in a register of the RAID card. The method further includes determining whether the stored RAID level is correctly set in the RAID card according to the data in the register, and storing the determined result in the storage unit.

8 Claims, 3 Drawing Sheets

ELECTRONIC DEVICE AND METHOD FOR TESTING REDUNDANT ARRAY OF INDEPENDENT DISKS LEVEL

FIELD

The present disclosure relates to electronic devices, and particularly to an electronic device capable of testing Redundant Array of Independent Disks (RAID) level of a RAID card and a method for testing the RAID level of the RAID card.

BACKGROUND

Many computers or servers often include a RAID card, which has an ability to combine multiple disks into a disk array for the purposes of data redundancy and performance improvement. Data is distributed across the multiple disks according to the disk array arrangements of the RAID card, referred to as RAID levels. The simplest RAID level 1 includes one or more disks for storing data and an equal number of additional "mirror" disks for storing copies of the data written to the disks. Other RAID levels, identified as RAID levels 2, 3, 4 and 5, segment the data into portions for storage across the multiple disks.

Before shipment, a test is needed to check whether a preset RAID level is correctly set in the RAID card.

BRIEF DESCRIPTION OF THE DRAWINGS

Implementations of the present disclosure will now be described, by way of example only, with reference to the following drawings. The modules in the drawings are not necessarily drawn to scale, the emphasis instead being placed upon clearly illustrating the principles of the present disclosure. Moreover, in the drawings, like reference numerals designate corresponding portions throughout the views. The description is not to be considered as limiting the embodiments described herein.

DETAILED DESCRIPTION

Figure 1:
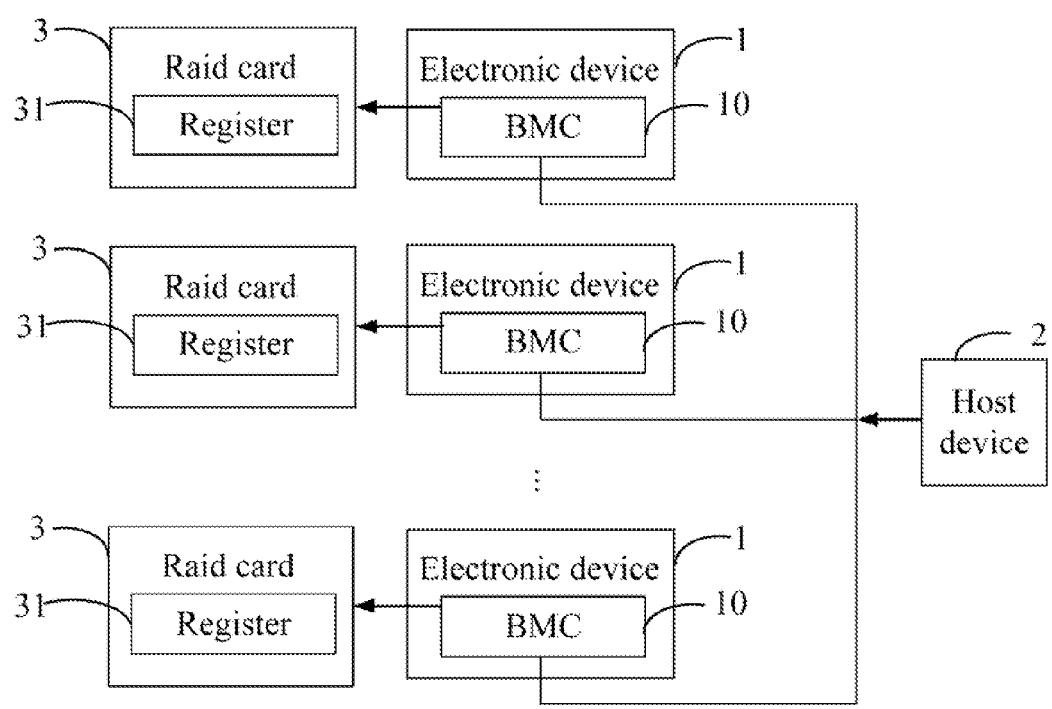
FIG. 1 is a perspective view showing an applied environment of an electronic device, in accordance with an exemplary embodiment.
Figure 2:
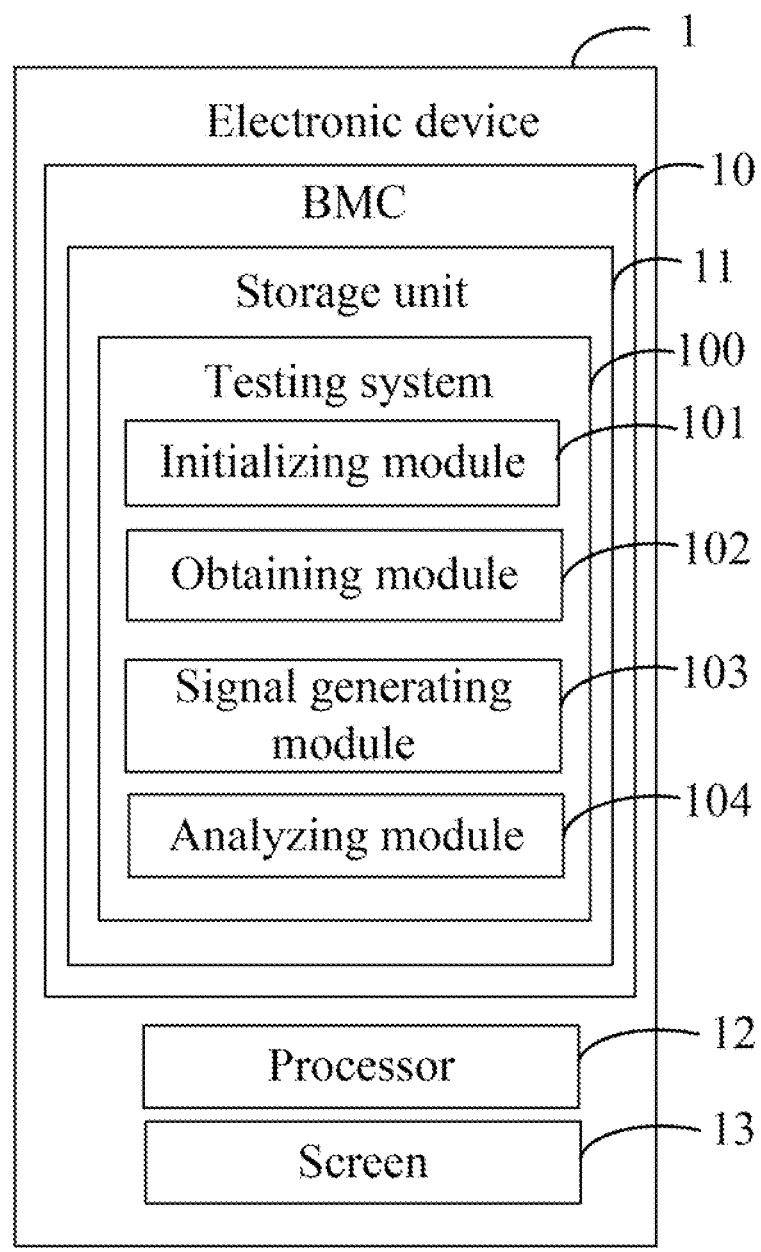
FIG. 2 is a block diagram of the electronic device of FIG. 1.

FIG. 1 is a perspective view showing an applied environment of an electronic device 1 according to an exemplary embodiment. The electronic device 1, such as a computer or a server, can include a baseboard management controller (BMC) 10. The BMC 10 can be coupled to an RAID card 3 via an I²C bus, and can be coupled to a host device 2 via a wireless access port or a wired access port (not shown). FIG. 1 shows that the host device 2 can be coupled to a number of electronic devices 1, and each electronic device 1 can be coupled to an RAID card 3. FIG. 2 shows that each electronic device 1 can further include a processor 12. The BMC 10 of each electronic device 1 can include a storage unit 11. The storage unit 11 can store data of RAID level set to the RAID card 3 coupled to the electronic device 1. The storage unit 11 can further store a testing system 100. The system 100 can include a variety of modules which can be collections of software instructions executable by the processor 12 to provide the functions of the system 100. In the illustrated embodiment, the system 100 can be executed by the processor 12 to set the stored RAID level to the RAID card 3 in response to a boot command from the host device 2, and further test whether the stored RAID level is correctly set in the RAID card 3.

In the example illustrated in FIG. 1, the system 100 can include an initializing module 101, an obtaining module 102, a signal generating module 103, and an analyzing module 104 which can be collections of software instructions. The software instructions can be executed by one or more processors.

In the illustrated embodiment, the Basic Input Output System (BIOS) of the electronic device 1 can display a user interface including an option that enables a user to select whether to initialize the BMC 10. Once the user selects to initialize the BMC 10, the initializing module 101 can initialize the BMC 10 when the electronic device 1 is powered on. Otherwise, the initializing module 101 does not initialize the BMC 10 when the electronic device 1 is powered on.

After the BMC 10 has been initialized, the obtaining module 102 can be ready to obtain the boot command from the host device 2.

The signal generating module 103 can generate a control signal according to the stored RAID level in response to the obtained boot command from the host device 2, and can transmit the control signal to the RAID card 3 via the I²C bus. The control signal can be used to direct the RAID card 3 to set the stored RAID level, test whether the stored RAID level is correctly set, and store data indicative of the tested result in a register 31 of the RAID card 3. In the illustrated embodiment, the RAID card 3 can write data "1" to the register 31 when the stored RAID level is correctly set in the RAID card 3. Otherwise, the RAID card 3 can write data "0" to the register 31.

The analyzing module 104 can obtain the data stored in the register 31 after the signal generating module 103 transmits the control signal to the RAID card 3, and can determine whether or not the stored RAID level is correctly set in the RAID card 3 according to the obtained data. In the illustrated embodiment, the RAID card 3 can write data to a preset location in the register 31, and the analyzing module 104 can obtain the data from the preset location of the register 31.

The analyzing module 104 can further store the determined result in the storage unit 11 of the BMC 10, thus enabling the host device 2 to obtain the determined result from the storage unit 11. In the illustrated embodiment, when the determined result indicates that the stored RAID level is not correctly set in the RAID card 3, the host device 2 can transmit a resetting signal to the BMC 10. Then, the signal generating module 103 can further transmit the control signal to the RAID card 3 in response to the resetting signal, to direct the RAID card 3 to set the stored RAID level.

Figure 3:
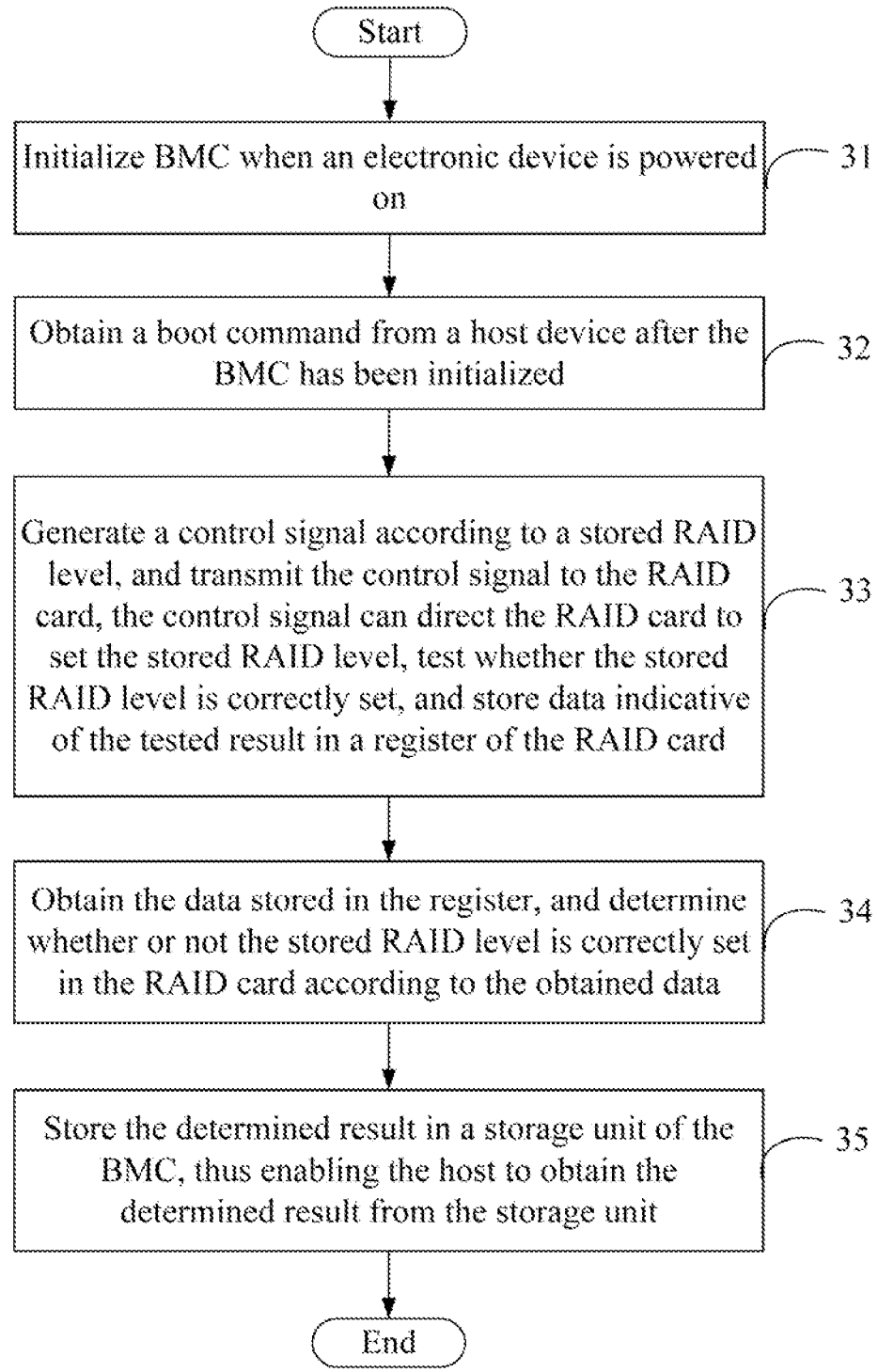
FIG. 3 is a flowchart of a method for testing RAID level of a RAID card of the electronic device of FIG. 1, in accordance with an exemplary embodiment.

FIG. 3 is a flowchart of a method for testing RAID level of the RAID card 3, in accordance with an exemplary embodiment.

In 31, the initializing module can initialize the BMC when the electronic device is powered on.

In 32, the obtaining module can obtain the boot command from the host device after the BMC has been initialized.

In 33, the signal generating module can generate a control signal according to the stored RAID level in response to the obtained boot command, and can transmit the control signal to the RAID card. The control signal can be used to direct the RAID card to set the stored RAID level, test whether the stored RAID level is correctly set, and store data indicative of the tested result in a register of the RAID card.

In 34, the analyzing module can obtain the data stored in the register after the signal generating module transmits the control signal to the RAID card, and can determine whether or not the stored RAID level is correctly set in the RAID card according to the obtained data.

In 35, the analyzing module can store the determined result in the storage unit of the BMC, thus enabling the host device to obtain the determined result from the storage unit.

It is believed that the present embodiments and their advantages will be understood from the foregoing description, and it will be apparent that various changes may be made thereto without departing from the scope of the disclosure or sacrificing all of its material advantages, the examples hereinbefore described merely being exemplary embodiments of the present disclosure.

What is claimed is:

1. An electronic device comprising:
    a baseboard management controller (BMC) comprising a storage unit, the BMC being configured to connect to a redundant array of independent disks (RAID) card and a host device, the storage unit storing data of RAID level set to the RAID card, the storage unit further storing a plurality of modules; and
    a processor configured to execute the plurality of modules, wherein the plurality of modules comprises:
        an obtaining module to obtain a boot command from the host device after the BMC has been initialized;
        a signal generating module to generate a control signal according to the stored RAID level in response to the obtained boot command, and transmit the control signal to the RAID card, and the control signal is configured to direct the RAID card to set the stored RAID level, test whether the stored RAID level is correctly set, and store data indicative of the tested result in a register of the RAID card; and
        an analyzing module to obtain the data stored in the register after the signal generating module transmits the control signal to the RAID card, determine whether the stored RAID level is correctly set in the RAID card according to the obtained data, and store the determined result in the storage unit of the BMC.

2. The electronic device of claim 1, wherein the BMC is coupled to the RAID card via an I²C bus, and is coupled to the host device via a wireless access port or a wired access port.

3. The electronic device of claim 1, wherein the plurality of modules further comprises an initializing module configured to initialize the BMC when the electronic device is powered on.

4. The electronic device of claim 1, wherein the analyzing module is configured to determine that the stored RAID level is correctly set in the RAID card when data "1" is obtained from the register, and determine that the stored RAID level is not correctly set in the RAID card when data "0" is obtained from the register.

5. The electronic device of claim 1, wherein the analyzing module is configured to obtain the data from a preset location of the register.

6. A method for testing redundant array of independent disks (RAID) level of a RAID card, the RAID card being coupled to a baseboard management controller (BMC) of an electronic device, the BMC being coupled to a host device, the BMC comprising a storage unit for storing data of RAID level set to the RAID card, the method comprising:
    obtaining a boot command from the host device after the BMC has been initialized;
    generating a control signal according to the stored RAID level in response to the boot command;
    transmitting the control signal to the RAID card, wherein the control signal is configured to direct the RAID card to set the stored RAID level, test whether the stored RAID level is correctly set, and store data indicative of the tested result in a register of the RAID card;
    obtaining the data stored in the register;
    determining whether the stored RAID level is correctly set in the RAID card according to the obtained data; and
    storing the determined result in the storage unit of the BMC.

7. The method of claim 6, wherein determining whether the stored RAID level is correctly set in the RAID card according to the obtained data further comprises:
    determining that the stored RAID level is correctly set in the RAID card when data "1" is obtained from the register; and
    determining that the stored RAID level is not correctly set in the RAID card when data "0" is obtained from the register.

8. The method of claim 6, wherein storing the determined result in the storage unit of the BMC further comprises:
    transmitting a resetting signal to the BMC when the determined result indicates that the stored RAID level is not correctly set in the RAID card; and
    transmitting the control signal to the RAID card in response to the resetting signal, to direct the RAID card to set the stored RAID level.

* * * * *